(12) United States Patent
Sychev et al.

(10) Patent No.: US 10,313,703 B2
(45) Date of Patent: Jun. 4, 2019

(54) VIDEO DATA ENCODING AND DECODING METHODS AND APPARATUSES

(71) Applicant: Huawei Technologies Co., Ltd., Shenzhen (CN)

(72) Inventors: Maxim Sychev, Moscow (RU); Jin Song, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 347 days.

(21) Appl. No.: 15/258,450

(22) Filed: Sep. 7, 2016

(65) Prior Publication Data
US 2016/0381394 A1    Dec. 29, 2016

Related U.S. Application Data

(63) Continuation of application No. PCT/CN2015/074421, filed on Mar. 17, 2015.

(30) Foreign Application Priority Data

Mar. 18, 2014    (CN) .......................... 2014 1 0100869

(51) Int. Cl.
*H04N 19/65* (2014.01)
*H04N 19/46* (2014.01)
*H04N 19/184* (2014.01)

(52) U.S. Cl.
CPC .......... *H04N 19/65* (2014.11); *H04N 19/184* (2014.11); *H04N 19/46* (2014.11)

(58) Field of Classification Search
None
See application file for complete search history.

(56) References Cited

U.S. PATENT DOCUMENTS 5,289,276 A    2/1994 Siracusa
2006/0256235 A1    11/2006 Nguyen

FOREIGN PATENT DOCUMENTS

CN    1115951 A    1/1996
CN    101695134 A    4/2010
(Continued)

OTHER PUBLICATIONS

Sychev et al., "MV-HEVC/SHVC HLS: Redundant frames for SHVC/MV-HEVC/HEVC", JCT-3V Meeting; San Jose; (The Joint Collaborative Team on 3D Video Coding Extension Development of ISO/IEC JTC1/SC29/WG11 and ITU-T SG.16_; Jan. 2, 2014.*

(Continued)

*Primary Examiner* — James M Anderson, II
(74) *Attorney, Agent, or Firm* — Conley Rose, P.C.

(57) ABSTRACT

Video data encoding and decoding methods and apparatuses which include determining a to-be-encoded information group in a to-be-encoded video sequence, generating a primary information group corresponding to the to-be-encoded information group, wherein the primary information group comprises a first data information, indication information that indicates whether the to-be-encoded information group is the primary information group or a redundant information group, and location information of the primary information group, generating the redundant information group corresponding to the to-be-encoded information group, wherein the redundant information group comprises a second data information, location information of the redundant information group, indication information that indicates whether the to-be-encoded information group is the primary information group or the redundant information group, and location relationship information of the redundant information group and the primary information group, (Continued)

and encoding the primary information group and the redundant information group into a bitstream.

20 Claims, 9 Drawing Sheets

(56) References Cited

FOREIGN PATENT DOCUMENTS

| | | |
|---|---|---|
| CN | 102438152 A | 5/2012 |
| CN | 103501441 A | 1/2014 |
| WO | 2007081150 A1 | 7/2007 |
| WO | 2007099637 A1 | 9/2007 |
| WO | 2011023776 A1 | 3/2011 |

OTHER PUBLICATIONS

Machine Translation and Abstract of International Publication No. WO2007099637, Sep. 7, 2007, 5 pages.

"Series H: Audiovisual and Multimedia Systems, Infrastructure of audiovisual services—Coding of moving video, Advanced video coding for generic audiovisual services," ITU-T, H.264, Apr. 2013, 10 pages.

Foreign Communication From a Counterpart Application, Japanese Application No. 2016-556710, Japanese Office Action dated Sep. 19, 2017, 3 pages.

Zhu, C., et al., "Coding of Redundant Pictures for Improved Error Resilience," XP30006325, JVT-R058, Jan. 14-20, 2006, 9 pages.

Wang, Y., et al., "AHG9: HEVC SEI messages cleanups," XP30113533, JCTVC-L0045v1, Jan. 14-23, 2013, 5 pages.

Maxim, S., et al., "HEVC/MV-HEVC/SHVC HLS: Redundant pictures SEI messages," XP30115999, JCTVC-Q0090, Mar. 27-Apr. 4, 2014, 6 pages.

Maxim, S., et al., "Redundant frames for SHVC/MV-HEVC/HEVC," XP30131787, JCT3V-G0043, Jan. 11-17, 2014, 8 pages.

Sullivan, G., et al., "Meeting report of the 16th meeting of the Joint Collaborative Team on Video Coding (JCT-VC), San Jose, US, Jan. 9-17, 2014," XP55327249, JCTVC-P_Notes_d54, Jan. 9-17, 2014, 134 pages.

Foreign Communication From a Counterpart Application, European Application No. 15765911.1, Extended European Search Report dated Feb. 6, 2017, 12 pages.

Foreign Communication From a Counterpart Application, PCT Application No. PCT/CN2015/074421, English Translation of International Search Report dated Jun. 5, 2015, 3 pages.

Foreign Communication From a Counterpart Application, PCT Application No. PCT/CN2015/074421, English Translation of Written Opinion dated Jun. 5, 2015, 5 pages.

\* cited by examiner

| sei_payload(payloadType, payloadSize) { | Descriptor |
|---|---|
|     if(nal_unit_type = = PREFIX_SEI_NUT) | |
|     ... | |
|         else if(payloadType = = 135) | |
|             redundant_pic_info(payloadSize) | |
|         else if(payloadType = = 136) | |
|             primary_pic_info(payloadSize) | |
|     ... | |
|     } | |
| } | |
| redundant_pic_info(payloadSize) { | |
|     pic_order_cnt_delta | ue(v) |
|     prm_poc_reset_flag | u(1) |
| } | |
| primary_pic_info(payloadSize) { | |
|     pic_order_cnt_delta | ue(v) |
| } | |

FIG. 9

VIDEO DATA ENCODING AND DECODING METHODS AND APPARATUSES

CROSS-REFERENCE TO RELATED APPLICATIONS

This application is a continuation of International Application No. PCT/CN2015/074421, filed on Mar. 17, 2015, which claims priority to Chinese Patent Application No. 201410100869.3, filed on Mar. 18, 2014, both of which are hereby incorporated by reference in their entireties.

TECHNICAL FIELD

The present application relates to the field of encoding and decoding technologies, and in particular, to video data encoding and decoding methods and apparatuses.

BACKGROUND

In a videoconferencing communications system, video data is generally packetized using Real-time Transport Protocol (RTP) to generate an RTP data packet, and then the RTP data packet is transmitted using User Datagram Protocol (UDP). A video includes multiple picture frames. However, UDP is an unreliable transmission protocol. In a transmission process, a packet loss is likely to occur during network congestion, which affects quality of a video reconstructed at a decoder.

To resolve the foregoing problem, a redundancy picture technology may be introduced into a video data encoding process. In a video compression coding technology, each video display image is referred to as a picture. A field is obtained by scanning a picture in alternate rows, and correspondingly a picture scanned row by row may be referred to as a frame. One frame may include one or more slices, or may include one or more tiles, and a difference is that slice division is performed in an order of a basic coding unit, but tile division is performed according to a picture area. A case in which a frame is used as a processing unit is merely used as an example, which may include, in a video data encoding process, each picture frame is encoded to generate a primary frame, and at the same time generate one or more redundant frames corresponding to the primary frame, and a primary slice and a redundant slice are encapsulated into different packets for transmission. In this way, the decoder may perform decoding using the following method which includes, parsing header information of a current frame to obtain attribute information of the current frame, where the attribute information of the current frame is used to indicate whether the current frame is a primary frame or a redundant frame, and discarding the current redundant frame if the current frame is a redundant frame and a primary frame corresponding to the current frame is a normal frame (that is, a packet is not lost and data for reconstructing the frame is complete), or copying header information of the primary frame to a location of the header information of the current frame, and continuing to parse other information of the current frame in order to reconstruct a video using the redundant frame if the current frame is a redundant frame and a primary frame corresponding to the current frame is not a normal frame (that is, a packet is lost and decoding cannot be properly performed).

The foregoing decoding method requires that the primary frame be adjacent to the redundant frame corresponding to the primary frame in terms of decoding locations. A correspondence between the primary frame and the redundant frame cannot be reflected if the primary frame is not adjacent to the redundant frame corresponding to the primary frame in terms of decoding locations, which increases a possibility of losing both the primary frame and the redundant frame. In addition, the primary frame needs to arrive at the decoder before the redundant frame does, which reduces transmission flexibility.

SUMMARY

Embodiments of the present application provide video data encoding and decoding methods and apparatuses, which can reduce a possibility of losing both a primary frame and a redundant frame and improve transmission robustness and flexibility.

An embodiment of the present application provides a video data encoding method, including determining a to-be-encoded information group in a to-be-encoded video sequence, generating a primary information group corresponding to the to-be-encoded information group, where the primary information group includes first data information, indication information that indicates whether the to-be-encoded information group is a primary information group or a redundant information group, and location information of the primary information group, generating a redundant information group corresponding to the to-be-encoded information group, where the redundant information group includes second data information, location information of the redundant information group, indication information that indicates whether the to-be-encoded information group is a primary information group or a redundant information group, and location relationship information of the redundant information group and the primary information group, and encoding the primary information group and the redundant information group into a bitstream.

An embodiment of the present application further provides a video data decoding method, including acquiring a to-be-decoded bitstream, and determining a to-be-decoded information group, obtaining, by means of parsing, a primary information group corresponding to the to-be-decoded information group, where the primary information group includes first data information, indication information that indicates whether the to-be-decoded information group is a primary information group or a redundant information group, and location information of the primary information group, obtaining, by means of parsing, a redundant information group corresponding to the to-be-decoded information group, where the redundant information group includes second data information, location information of the redundant information group, indication information that indicates whether the to-be-decoded information group is a primary information group or a redundant information group, and location relationship information of the redundant information group and the primary information group, where the location relationship information of the redundant information group and the primary information group is used to deduce the location information of the primary information group, and acquiring a decoded information group based on the primary information group obtained by means of parsing or the redundant information group obtained by means of parsing, where the decoded information group is used for reconstruction of an encoded video sequence.

An embodiment of the present application further provides a video data encoding apparatus that includes a processor, where the processor is configured to determine a to-be-encoded information group in a to-be-encoded video sequence, generate a primary information group corresponding to the to-be-encoded information group, where the primary information group includes first data information, indication information that indicates whether the to-be-encoded information group is a primary information group or a redundant information group, and location information of the primary information group, generate a redundant information group corresponding to the to-be-encoded information group, where the redundant information group includes second data information, location information of the redundant information group, indication information that indicates whether the to-be-encoded information group is a primary information group or a redundant information group, and location relationship information of the redundant information group and the primary information group, and encode the primary information group and the redundant information group into a bitstream.

An embodiment of the present application further provides a video data decoding apparatus that includes a processor, where the processor is configured to acquire a to-be-decoded bitstream, and determine a to-be-decoded information group, obtain, by means of parsing, a primary information group corresponding to the to-be-decoded information group, where the primary information group includes first data information, indication information that indicates whether the to-be-decoded information group is a primary information group or a redundant information group, and location information of the primary information group, obtain, by means of parsing, a redundant information group corresponding to the to-be-decoded information group, where the redundant information group includes second data information, location information of the redundant information group, indication information that indicates whether the to-be-decoded information group is a primary information group or a redundant information group, and location relationship information of the redundant information group and the primary information group, where the location relationship information of the redundant information group and the primary information group is used to deduce the location information of the primary information group, and acquire a decoded information group based on the primary information group obtained by means of parsing or the redundant information group obtained by means of parsing, where the decoded information group is used for reconstruction of an encoded video sequence.

According to the encoding and decoding methods and apparatuses in the foregoing solutions, it is allowed that a gap is kept between locations of a primary frame and a corresponding redundant frame in a bitstream, which reduces a possibility of losing both the primary frame and the corresponding redundant frame and enhances transmission robustness. In addition, a decoder no more has a requirement for an order of decoding the primary frame and the redundant frame, which improves transmission flexibility.

BRIEF DESCRIPTION OF DRAWINGS

To describe the technical solutions in the embodiments of the present application more clearly, the following briefly describes the accompanying drawings required for describing the embodiments. The accompanying drawings in the following description show merely some embodiments of the present application, and a person of ordinary skill in the art may still derive other drawings from these accompanying drawings without creative efforts.

FIG. 9 is a syntax structural diagram of a video encoding method according to Embodiment 1 of the present application.

DESCRIPTION OF EMBODIMENTS

The following clearly describes the technical solutions in the embodiments of the present application with reference to the accompanying drawings in the embodiments of the present application. The described embodiments are merely some but not all of the embodiments of the present application. All other embodiments obtained by a person of ordinary skill in the art based on the embodiments of the present application without creative efforts shall fall within the protection scope of the present application.

The term "and/or" in this specification describes only an association relationship for describing associated objects and represents that three relationships have been generated. For example, A and/or B may represent the following three cases, where only A has been generated, both A and B have been generated, and only B has been generated. In addition, the character "/" in this specification generally indicates an "or" relationship between the associated objects.

All the embodiments are further described using an example in which each primary frame has a maximum of one corresponding redundant frame, which may be generalized to a case in which multiple redundant frames have been generated for each primary frame.

Embodiment 1

Figure 1:
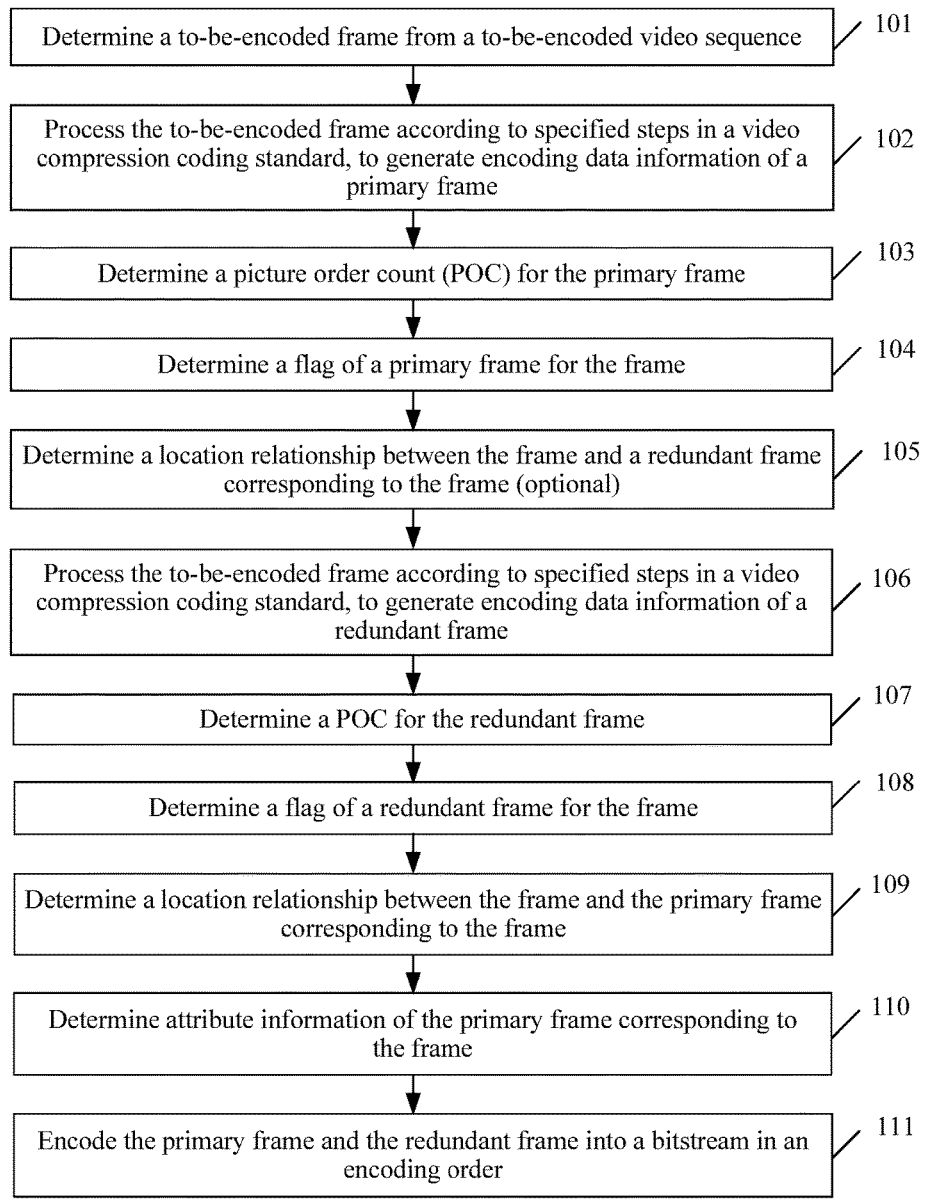
FIG. 1 is a flowchart of a video data encoding method according to Embodiment 1 of the present application.

As shown in FIG. 1, this embodiment of the present application provides a video data encoding method, including the following steps.

Step 101: Determine a to-be-encoded frame from a to-be-encoded video sequence.

Step 102: Process the to-be-encoded frame according to specified steps in a video compression coding standard, to generate encoding data information of a primary frame, where the steps generally include prediction, transformation, quantization, entropy encoding, filtering, and the like, the video compression standard may be H.264, H.265, scalable video coding (SVC), or the like, and the encoding data information includes prediction mode information, partitioning mode information, transformation mode information, quantization parameter information, a filtering parameter, residual information, and the like.

Step 103: Determine a picture order count (POC) for the frame. A POC represents a display order of an encoded frame in a video sequence. A primary frame and a redundant frame are corresponding to a same encoded frame. Therefore, to prevent a POC of the primary frame being the same as that of the redundant frame, exemplarily, if each primary frame has a maximum of one corresponding redundant frame, the POC of the primary frame may as well be limited to consecutive even numbers, for example, 0, 2, 4, 6, . . . , and the POC of the redundant frame is limited to odd numbers. According to an actual application requirement, the POC of the redundant frame may be consecutive odd numbers, for example, 1, 3, 5, 7, . . . , or may be inconsecutive odd numbers. For example, the POC of the redundant frame may be set to 1 plus the POC of the corresponding primary frame.

Figure 10:
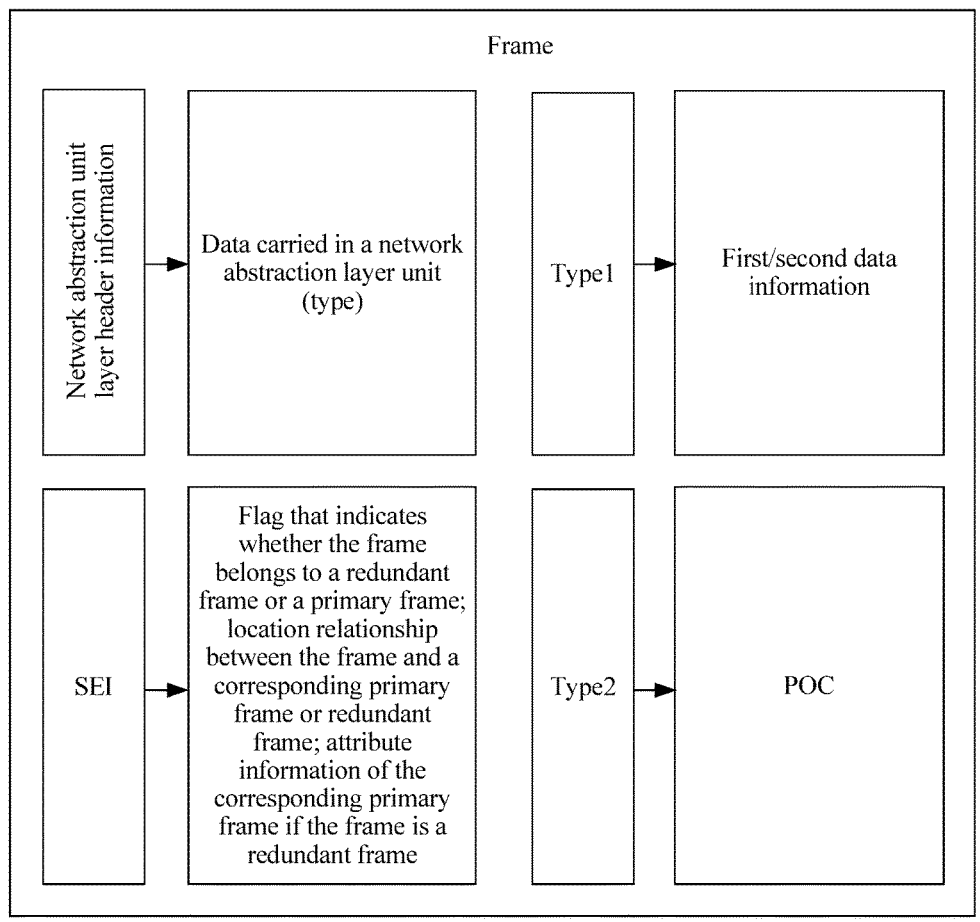
FIG. 10 is a frame structural diagram of a video encoding method according to Embodiment 1 of the present application.

Step 104: Determine a flag of a primary frame for the frame. It needs to be explained that as shown in FIG. 10, single-frame data may be divided into different network abstraction layer units. The network abstraction layer unit includes a network abstraction layer unit header and a data part. The network abstraction layer unit header includes a network abstraction layer unit type, and the network abstraction layer unit type determines a type of data included in the network abstraction layer unit. PREFIX_SEI_NUT (supplemental enhancement information prefix) mentioned in the following description is a network abstraction layer unit type. Exemplarily, a flag bit may be added into PREFIX_SEI_NUT. The frame is a primary frame if a value A is written, or the frame is a redundant frame if a value B is written, which may be further described using examples.

Example 1

```
if(nal_unit_type = = PREFIX_SEI_NUT)
    ...
        else if(payloadType = = 135)
            redundant_pic_info(payloadSize)
        else if(payloadType = = 136)
            primary_pic_info(payloadSize)
```

That is,

If a network abstraction layer unit type is a supplemental enhancement information prefix
...
  Or if an information payload type is 135
    Set redundant-frame information (an information payload size)
  Or if an information payload type is 136
    Set primary-frame information (an information payload size)

It may be explained that the frame is a redundant frame if a network abstraction layer unit type is a supplemental enhancement information prefix and an information payload type is 135, or the frame is a primary frame if a network abstraction layer unit type is a supplemental enhancement information prefix and an information payload type is 136.

Example 2

```
if(nal_unit_type = = PREFIX_SEI_NUT)
    ...
        else if(payloadType = = 135)
    if(pic_type == 0)
            redundant_pic_info(payloadSize)
        else
            primary_pic_info(payloadSize)
```

That is,

If a network abstraction layer unit type is a supplemental enhancement information prefix
...
  Or if an information payload type is 135
If a frame type is 0
    Set redundant-frame information (an information payload size)
  Otherwise
    Set primary-frame information (an information payload size)

It may be explained that the frame is a redundant frame if a network abstraction layer unit type is a supplemental enhancement information prefix, an information payload type is 135, and a frame type is 0, or the frame is a primary frame if a network abstraction layer unit type is a supplemental enhancement information prefix, an information payload type is 135, and a frame type is 1.

Example 3

```
if(nal_unit_type = = PREFIX_SEI_NUT)
    ...
        else if(payloadType = = 135)
            redundant_pic_info(payloadSize)
    else if(nal_unit_type = = SUFFIX_SEI_NUT)
    ...
        else if(payloadType = = 135)
            primary_pic_info(payloadSize)
```

That is,

If a network abstraction layer unit type is a supplemental enhancement information prefix
...
  Or if an information payload type is 135
Set redundant-frame information (an information payload size)
  Or if a network abstraction layer unit layer is a supplemental enhancement information suffix
...
  Or if an information payload type is 135
Set primary-frame information (an information payload size)

It may be explained that the frame is a redundant frame if a network abstraction layer unit type is a supplemental enhancement information prefix and an information payload type is 135, or the frame is a primary frame if a network abstraction layer unit type is a supplemental enhancement information suffix and an information payload type is 135.

Step 105: Optionally determine a location relationship between the frame and a redundant frame corresponding to the frame. Exemplarily, it is assumed that the POC of the current primary frame is denoted as currPicOrderCntVal, the POC of the corresponding redundant frame is denoted as rdnPicOrderCntVal, and a POC difference between the two frames is denoted as pic_order_cnt_delta. The location relationship pic_order_cnt_delta=rdnPicOrderCntVal−currPicOrderCntVal if the redundant frame has been generated, where pic_order_cnt_delta may be a positive value or a negative value, representing a sequential order relationship between the primary frame and the corresponding redundant frame, that is, the sequential order relationship may be indicated by a plus sign or a minus sign, and an absolute value of pic_order_cnt_delta may range from 0 to 256 (including 0 and 256). The location relationship may be set, for example, to 1 according to an actual requirement if the redundant frame has not been generated.

Example

```
primary_pic_info(payloadSize) {
    pic_order_cnt_delta
}
```

In a special case, when it is allowed that the primary frame and the corresponding redundant frame are located in different group of pictures (GOPs), to describe the location relationship, a GOP relationship between the primary frame and the corresponding redundant frame further needs to be determined. Exemplarily, whether the primary frame and the corresponding redundant frame belong to a same GOP is determined. If the primary frame and the corresponding redundant frame do not belong to a same GOP, a quantity of GOPs that are spaced apart is determined.

In a first example, a flag indicating whether the primary frame and the corresponding redundant frame belong to a same GOP is set to gop_flag. The gop_flag is 0 if the primary frame and the corresponding redundant frame belong to a same GOP, or the gop_flag is 1 if the primary frame and the corresponding redundant frame do not belong to a same GOP. A gap of gop_circle GOPs is set between the primary frame and the corresponding redundant frame, where gop_circle may be a positive number or a negative number. Then, an actual location difference between the primary frame and the corresponding redundant frame is pic_order_cnt_delta+gop_circle x gop_flag.

In a second example, a gap of gop_circle GOPs is set between the primary frame and the corresponding redundant frame, where gop_circle is an integer. Then, an actual location difference between the primary frame and the corresponding redundant frame is pic_order_cnt_delta+gop_circle.

In the description of the location relationship in this embodiment, only a display order (that is, a POC) of a video frame is used to indicate a location. Alternatively, an actual encoding order that represents an order of processing each frame of data may be used to indicate a location, a writing order in which encoded data is written into a bitstream in a binary form may be used to indicate a location, or the like, which is not limited.

Step 106: Process the to-be-encoded frame according to specified steps in a video compression coding standard, to generate encoding data information of a redundant frame, where the steps generally include prediction, transformation, quantization, entropy encoding, filtering, and the like, the video compression standard may be H.264, H.265, SVC, or the like but is generally the same as the compression standard used in compressing the corresponding primary frame, and the encoding data information includes prediction mode information, partitioning mode information, transformation mode information, quantization parameter information, a filtering parameter, residual information, and the like, and may be the same as or different from the generated information of the corresponding primary frame.

Step 107: Determine a POC for the redundant frame, where a POC determining method keeps consistent with step 103.

Step 108: Determine a flag of a redundant frame for the frame. Exemplarily, a flag bit may be added into PREFIX_SEI_NUT. The frame is a primary frame if a value A is written, or the frame is a redundant frame if a value B is written, where a manner of determining the flag of the redundant frame keeps consistent with step 104.

Step 109: Determine a location relationship between the frame and the primary frame corresponding to the frame. Exemplarily, the location relationship pic_order_cnt_delta=currPicOrderCntVal−rdnPicOrderCntVal if the primary frame has been generated, where pic_order_cnt_delta may be a positive value or a negative value, representing a sequential order relationship between the redundant frame and the corresponding primary frame, and an absolute value of pic_order_cnt_delta may range from 0 to 256. The location relationship may be set, for example, to 1 according to an actual requirement if the primary frame has not been generated.

Example

```
redundant_pic_info(payloadSize) {
    pic_order_cnt_delta
}
```

In a special case, a GOP relationship between the redundant frame and the corresponding primary frame further needs to be determined to describe the location relationship when it is allowed that the redundant frame and the corresponding primary frame are located in different GOPs. Exemplarily, whether the redundant frame and the corresponding primary frame belong to a same GOP is determined. A quantity of GOPs that are spaced apart is determined if the redundant frame and the corresponding primary frame do not belong to a same GOP.

Step 110: Determine attribute information of the primary frame corresponding to the frame. Exemplarily, it is assumed that prm_poc_reset_flag indicates whether the primary frame is an instantaneous refresh frame, that is, a POC of the frame is reset when the frame is an instantaneous refresh frame.

Example

```
redundant_pic_info(payloadSize) {
    prm_poc_reset_flag
}
```

Step 111: Encode the primary frame and the redundant frame into a bitstream in an encoding order. That is encoding, the encoding data information, the POC information, and the flag information of the primary frame and the encoding data information, the POC information, and the flag information of the redundant frame into the bitstream in the encoding order, where a relative encoding order of the primary frame and the redundant frame is not limited.

As shown in FIG. 9, the method includes a set of a typical syntax structure in Embodiment 1.

Encoding is performed using this solution. It is allowed that a gap is kept between locations of a primary frame and a corresponding redundant frame in a bitstream, which reduces a possibility of losing both the primary frame and the corresponding redundant frame and enhances transmission robustness. In addition, a decoder no more has a requirement for an order of decoding the primary frame and the redundant frame, which improves transmission flexibility.

Embodiment 2

Figure 2:
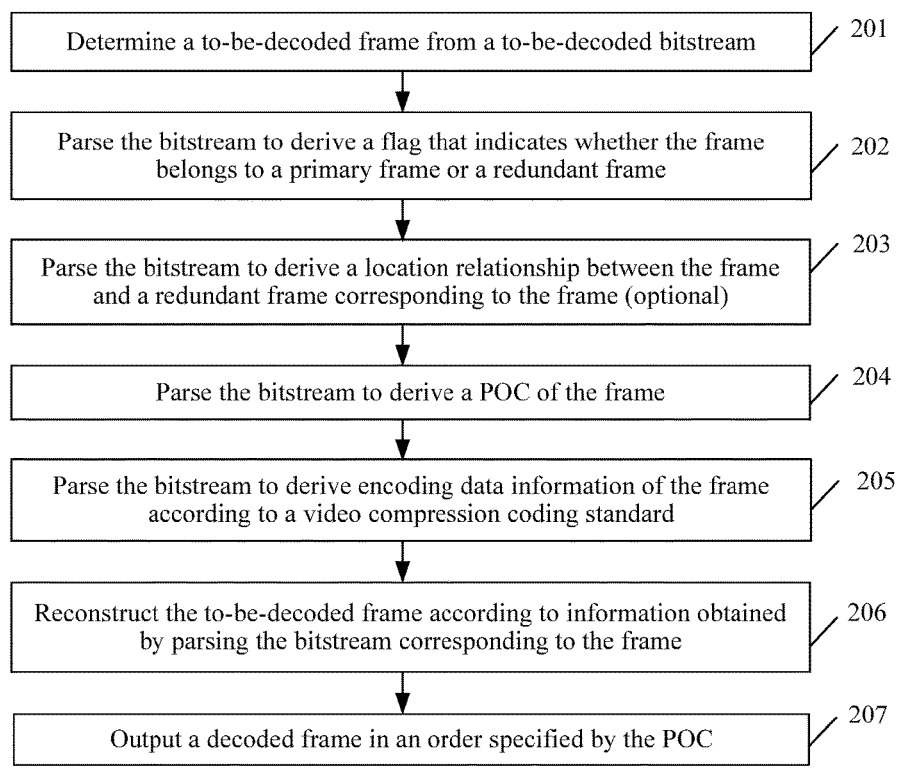
FIG. 2 is a flowchart of a video data decoding method according to Embodiment 2 of the present application.

The video data decoding method provided in this embodiment is corresponding to the foregoing video data encoding method. As shown in FIG. 2, the method includes a case in which a decoding order of a primary frame is before that of a corresponding redundant frame, the primary frame is not lost, and a current to-be-decoded frame is a primary frame, and the method may include the following steps.

Step 201: Determine a to-be-decoded frame from a to-be-decoded bitstream.

Step 202: Parse the bitstream to derive a flag that indicates whether the frame belongs to a primary frame or a redundant frame. Exemplarily, nal_unit_type may be parsed, if nal_unit_type is PREFIX_SEI_NUT, payloadType is parsed, if payloadType is a value A, the frame belongs to a primary frame, where a specific example is corresponding to step 104.

Step 203: Optionally parse the bitstream to derive, according to bitstream information, a location relationship between the frame and a redundant frame corresponding to the frame. In a special case, when it is allowed that the primary frame and the corresponding redundant frame are located in different GOPs, to describe the location relationship, a GOP relationship between the primary frame and the corresponding redundant frame further needs to be determined, which is corresponding to step 105. The information obtained in this step may be used as additional information for a special decoding requirement.

Step 204: Parse the bitstream to derive a POC of the frame, which is corresponding to step 103.

Step 205: Parse the bitstream to derive encoding data information of the frame according to a video compression coding standard, which is corresponding to step 102.

Step 206: Reconstruct the to-be-decoded frame according to information obtained by parsing the bitstream corresponding to the frame.

Step 207: Output a decoded frame in an order specified by the POC.

Embodiment 3

Figure 3:
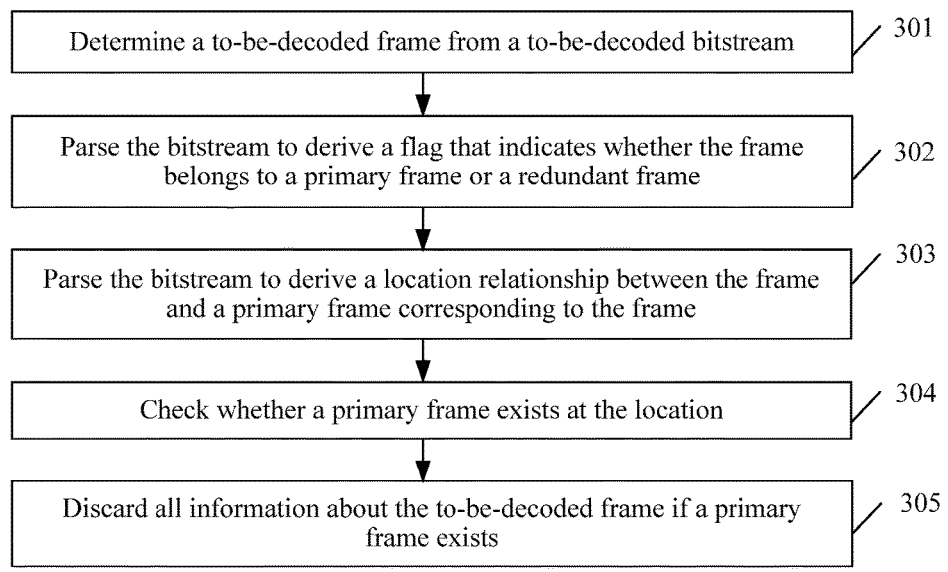
FIG. 3 is a flowchart of another video data decoding method according to Embodiment 3 of the present application.

The video data decoding method provided in this embodiment is corresponding to the video data encoding method in Embodiment 1. As shown in FIG. 3, the method includes a case in which a decoding order of a primary frame is before that of a corresponding redundant frame, the primary frame is not lost, and a current to-be-decoded frame is a redundant frame, and the method may include the following steps.

Step 301: Determine a to-be-decoded frame from a to-be-decoded bitstream.

Step 302: Parse the bitstream to derive a flag that indicates whether the frame belongs to a primary frame or a redundant frame. Exemplarily, nal_unit_type may be parsed, if nal_unit_type is PREFIX_SEI_NUT, payloadType is parsed, if payloadType is a value B, the frame belongs to a redundant frame, where a specific example is corresponding to step 108.

Step 303: Parse the bitstream to derive a location relationship between the frame and a primary frame corresponding to the frame. In a special case, when it is allowed that the redundant frame and the corresponding primary frame are located in different GOPs, to describe the location relationship, a GOP relationship between the redundant frame and the corresponding primary frame further needs to be determined, which is corresponding to step 109. According to this step, a location of the primary frame corresponding to the frame can be determined.

Step 304: Check whether a primary frame exists at a location obtained in step 303.

Step 305: Discard all information about the to-be-decoded frame if the primary frame exists.

Embodiment 4

Figure 4:
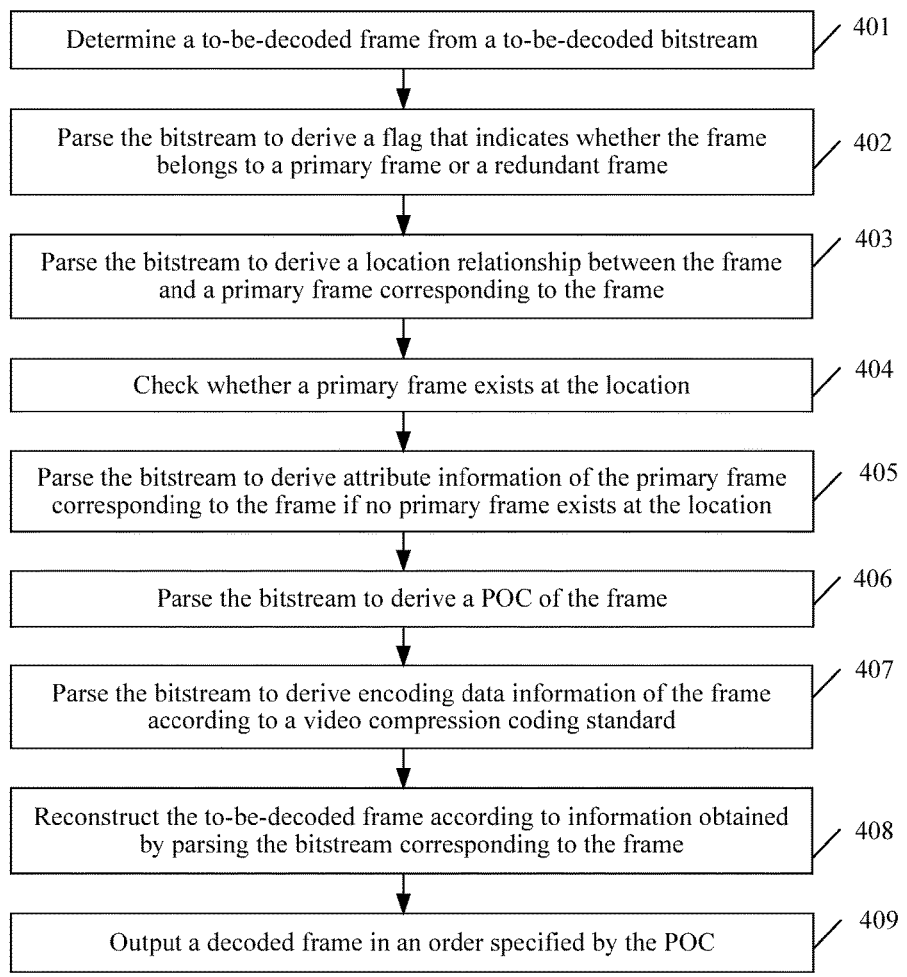
FIG. 4 is a flowchart of another video data decoding method according to Embodiment 4 of the present application.

The video data decoding method provided in this embodiment is corresponding to the video data encoding method in Embodiment 1. As shown in FIG. 4, the method includes a case in which a decoding order of a primary frame is before that of a corresponding redundant frame, the primary frame is lost, a current to-be-decoded frame is a redundant frame, and the method may include the following steps.

Step 401: Determine a to-be-decoded frame from a to-be-decoded bitstream.

Step 402: Parse the bitstream to derive a flag that indicates whether the frame belongs to a primary frame or a redundant frame. Exemplarily, nal_unit_type may be parsed, if nal_unit_type is PREFIX_SEI_NUT, payloadType is parsed, if payloadType is a value B, the frame belongs to a redundant frame, where a specific example is corresponding to step 108.

Step 403: Parse the bitstream to derive a location relationship between the frame and a primary frame corresponding to the frame. In a special case, when it is allowed that the redundant frame and the corresponding primary frame are located in different GOPs, to describe the location relationship, a GOP relationship between the redundant frame and the corresponding primary frame further needs to be determined, which is corresponding to step 109. According to this step, a location of the primary frame corresponding to the frame can be determined.

Step 404: Check whether a primary frame exists at a location obtained in step 403.

Step 405: Parse the bitstream to derive attribute information of the primary frame corresponding to the frame if the primary frame does not exists at the location, which is corresponding to step 110. The attribute information is used as attribute information of the to-be-decoded frame.

Step 406: Parse the bitstream to derive a POC of the frame, which is corresponding to step 107. The POC is used as a POC of the to-be-decoded frame.

Step 407: Parse the bitstream to derive encoding data information of the frame according to a video compression coding standard, which is corresponding to step 106.

Step 408: Reconstruct the to-be-decoded frame according to information obtained by parsing the bitstream corresponding to the frame.

Step 409: Output a decoded frame in an order specified by the POC.

Embodiment 5

Figure 5:
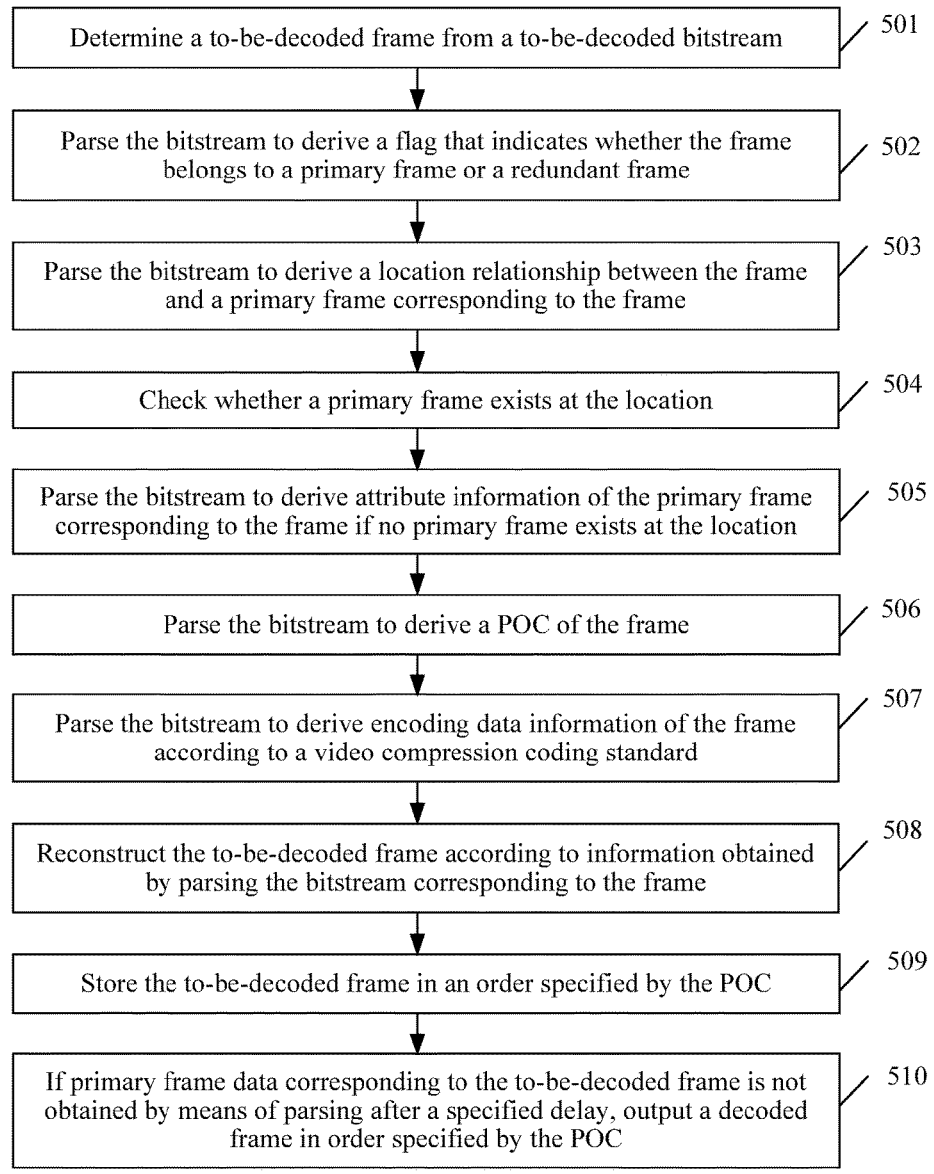
FIG. 5 is a flowchart of another video data decoding method according to Embodiment 5 of the present application.

The video data decoding method provided in this embodiment is corresponding to the video data encoding method in Embodiment 1. As shown in FIG. 5, the method includes a case in which a decoding order of a redundant frame is before that of a corresponding primary frame, a current to-be-decoded frame is a redundant frame, and the method may include the following steps.

Step 501: Determine a to-be-decoded frame from a to-be-decoded bitstream.

Step 502: Parse the bitstream to derive a flag that indicates whether the frame belongs to a primary frame or a redundant frame. Exemplarily, nal_unit_type may be parsed, if nal_unit_type is PREFIX_SEI_NUT, payloadType is parsed, if payloadType is a value B, the frame belongs to a redundant frame, where a specific example is corresponding to step 108.

Step 503: Parse the bitstream to derive a location relationship between the frame and a primary frame corresponding to the frame. In a special case, a GOP relationship between the redundant frame and the corresponding primary frame further needs to be determined to describe the location relationship when it is allowed that the redundant frame and the corresponding primary frame are located in different GOPs, which is corresponding to step 109. According to this step, a location of the primary frame corresponding to the frame can be determined.

Step 504: Check whether a primary frame exists at a location obtained in step 503.

Step 505: Parse the bitstream to derive attribute information of the primary frame corresponding to the frame if the primary frame does not exists at the location, which is corresponding to step 110. The attribute information is used as attribute information of the to-be-decoded frame.

Step 506: Parse the bitstream to derive a POC of the frame, which is corresponding to step 107. The POC is used as a POC of the to-be-decoded frame.

Step 507: Parse the bitstream to derive encoding data information of the frame according to a video compression coding standard, which is corresponding to step 106.

Step 508: Reconstruct the to-be-decoded frame according to information obtained by parsing the bitstream corresponding to the frame.

Step 509: Store the to-be-decoded frame in an order specified by the POC.

Step 510: If primary frame data corresponding to the to-be-decoded frame is not obtained by means of parsing after a specified delay, output a decoded frame in an order specified by the POC.

Embodiment 6

Figure 6:
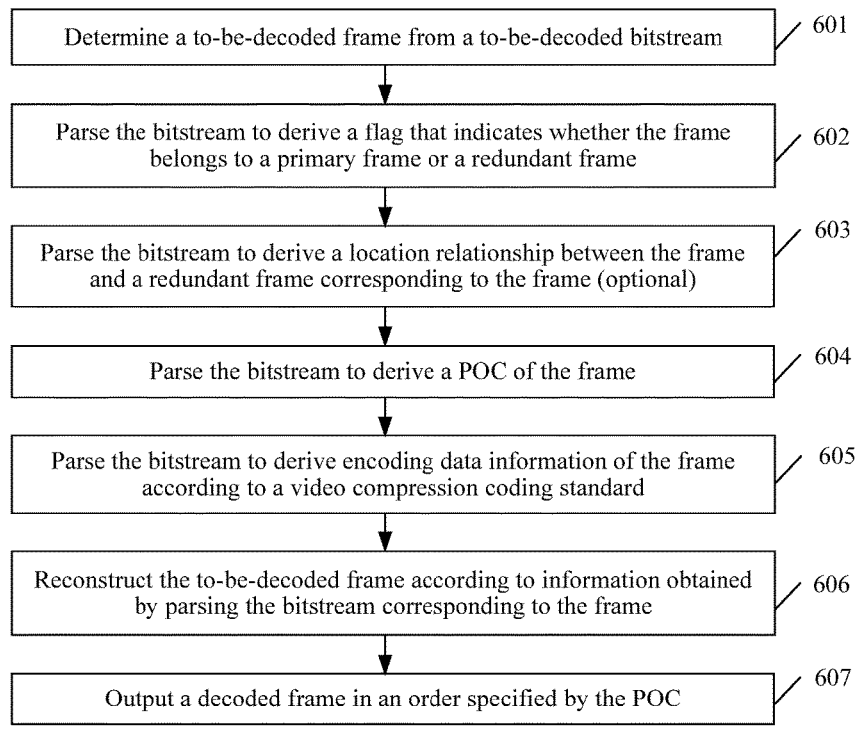
FIG. 6 is a flowchart of another video data decoding method according to Embodiment 6 of the present application.

The video data decoding method provided in this embodiment is corresponding to the foregoing video data encoding method. As shown in FIG. 6, the method includes a case in which a decoding order of a redundant frame is before that of a corresponding primary frame, a current to-be-decoded frame is a primary frame, and the method may include the following steps.

Step 601: Determine a to-be-decoded frame from a to-be-decoded bitstream.

Step 602: Parse the bitstream to derive a flag that indicates whether the frame belongs to a primary frame or a redundant frame. Exemplarily, nal_unit_type may be parsed, if nal_unit_type is PREFIX_SEI_NUT, payloadType is parsed, if payloadType is a value A, the frame belongs to a primary frame, where a specific example is corresponding to step 104.

Step 603: Optionally parse the bitstream to derive, according to bitstream information, a location relationship between the frame and a redundant frame corresponding to the frame. In a special case, a GOP relationship between the primary frame and the corresponding redundant frame further needs to be determined to describe the location relationship when it is allowed that the primary frame and the corresponding redundant frame are located in different GOPs, which is corresponding to step 105. The information obtained in this step may be used as additional information for a special decoding requirement.

Step 604: Parse the bitstream to derive a POC of the frame, which is corresponding to step 103.

Step 605: Parse the bitstream to derive encoding data information of the frame according to a video compression coding standard, which is corresponding to step 102.

Step 606: Reconstruct the to-be-decoded frame according to information obtained by parsing the bitstream corresponding to the frame.

Step 607: Output a decoded frame in an order specified by the POC.

Compared with an existing solution, according to the decoding method provided in Embodiment 2 to Embodiment 6, location relationship information of a primary frame and a corresponding redundant frame is carried in a bitstream, and it is allowed that a gap is kept between locations of the primary frame and the corresponding redundant frame in the bitstream, which reduces a possibility of losing both the primary frame and the corresponding redundant frame and enhances transmission robustness. In addition, a decoder no more has a requirement for an order of decoding the primary frame and the redundant frame, which improves transmission flexibility.

Embodiment 7

Figure 7:
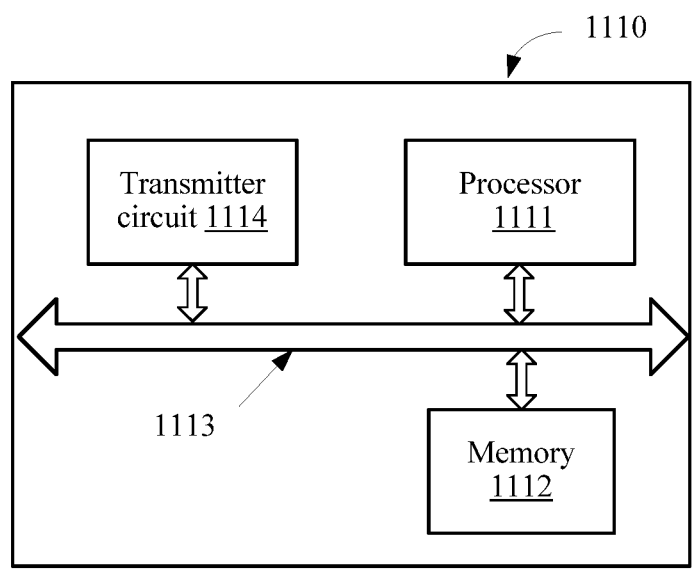
FIG. 7 is a schematic structural diagram of a video data encoding apparatus according to Embodiment 7 of the present application.

As shown in FIG. 7, this embodiment of the present application provides a video data encoding apparatus 1110. The apparatus may include a general-purpose processor (for example, a central processing unit (CPU)) or a dedicated processor (for example, a graphics processing unit (GPU)) that is configured to perform the video data encoding method shown in FIG. 1. The apparatus 1110 includes a processor 1111, a transmitter circuit 1114, a memory 1112, and a bus 1113. Further, the transmitter circuit 1114 may be configured to send a bitstream obtained after encoding, the memory 1112 is configured to store data obtained in a processing process, and the bus 1113 is configured to connect various apparatuses to carry communication.

The processor 1111 is configured to determine a to-be-encoded frame from a to-be-encoded video sequence.

The processor 1111 is further configured to process the to-be-encoded frame according to specified steps in a video compression coding standard, to generate encoding data information of a primary frame, where the steps generally include prediction, transformation, quantization, entropy encoding, filtering, and the like, the video compression standard may be H.264, H.265, SVC, or the like, and the encoding data information includes prediction mode information, partitioning mode information, transformation mode information, quantization parameter information, a filtering parameter, residual information, and the like.

The processor 1111 is further configured to determine a POC for the frame. A POC represents a display order of an encoded frame in a video sequence. A primary frame and a redundant frame are corresponding to a same encoded frame. Therefore, to prevent a POC of the primary frame being the same as that of the redundant frame, exemplarily, if each primary frame has a maximum of one corresponding redundant frame, the POC of the primary frame may as well be limited to consecutive even numbers, and the POC of the redundant frame is limited to odd numbers. Further, the POC of the redundant frame may be set to 1 plus the POC of the corresponding primary frame.

The processor 1111 is further configured to determine a flag of a primary frame for the frame. Exemplarily, a flag bit may be added into PREFIX_SEI_NUT. The frame is a primary frame if a value A is written, and the frame is a redundant frame if a value B is written.

Optionally, the processor 1111 is further configured to determine a location relationship between the frame and a redundant frame corresponding to the frame. Exemplarily, it is assumed that the POC of the current primary frame is denoted as currPicOrderCntVal, the POC of the corresponding redundant frame is denoted as rdnPicOrderCntVal, and a POC difference between the two frames is denoted as pic_order_cnt_delta. The location relationship pic_order_cnt_delta=rdnPicOrderCntVal−currPicOrderCntVal if the redundant frame has been generated, where pic_order_cnt_delta may be a positive value or a negative value, representing a sequential order relationship between the primary frame and the corresponding redundant frame, and an absolute value of pic_order_cnt_delta may range from 0 to 256. The location relationship may be set, for example, to 1 according to an actual requirement if the redundant frame has not been generated.

In a special case, a GOP relationship between the primary frame and the corresponding redundant frame further needs to be determined to describe the location relationship when it is allowed that the primary frame and the corresponding redundant frame are located in different GOPs. Exemplarily, whether the primary frame and the corresponding redundant frame belong to a same GOP is determined. A quantity of GOPs that are spaced apart is determined if the primary frame and the corresponding redundant frame do not belong to a same GOP.

Optionally, the processor 1111 is further configured to process the to-be-encoded frame according to specified steps in a video compression coding standard, to generate encoding data information of a redundant frame, where the steps generally include prediction, transformation, quantization, entropy encoding, filtering, and the like, the video compression standard may be H.264, H.265, SVC, or the like but is generally the same as the compression standard used in compressing the corresponding primary frame, and the encoding data information includes prediction mode information, partitioning mode information, transformation mode information, quantization parameter information, a filtering parameter, residual information, and the like, and may be the same as or different from the generated information of the corresponding primary frame.

The processor 1111 is further configured to determine a POC for the frame, where a POC determining method keeps consistent with step 103.

The processor 1111 is further configured to determine a flag of a redundant frame for the frame. Exemplarily, a flag bit may be added into PREFIX_SEI_NUT. The frame is a primary frame if a value A is written, or the frame is a redundant frame if a value B is written, where a manner of determining the flag of the redundant frame keeps consistent with step 104.

The processor 1111 is further configured to determine a location relationship between the frame and a primary frame corresponding to the frame. Exemplarily, the location relationship pic_order_cnt_delta=currPicOrderCntVal−rdnPicOrderCntVal if the primary frame has been generated, where pic_order_cnt_delta may be a positive value or a negative value, representing a sequential order relationship between the redundant frame and the corresponding primary frame, and an absolute value of pic_order_cnt_delta may range from 0 to 256. The location relationship may be set, for example, to 1 according to an actual requirement if the primary frame has not been generated.

In a special case, a GOP relationship between the redundant frame and the corresponding primary frame further needs to be determined to describe the location relationship when it is allowed that the redundant frame and the corresponding primary frame are located in different GOPs. Exemplarily, whether the redundant frame and the corresponding primary frame belong to a same GOP is determined. A quantity of GOPs that are spaced apart is determined if the redundant frame and the corresponding primary frame do not belong to a same GOP.

The processor 1111 is further configured to determine attribute information of the primary frame corresponding to the frame. Exemplarily, it is assumed that prm_poc_reset_flag indicates whether the primary frame is an instantaneous refresh frame, that is, when the frame is an instantaneous refresh frame, a POC of the frame is reset.

The processor 1111 is further configured to encode the encoding data information, the POC information, and the flag information of the primary frame and the encoding data information, the POC information, and the flag information of the redundant frame into the bitstream in an encoding order, where a relative encoding order of the primary frame and the redundant frame is not limited.

According to the video data encoding apparatus provided in this embodiment of the present application, it is allowed that a gap is kept between locations of a primary frame and a corresponding redundant frame in a bitstream, which reduces a possibility of losing both the primary frame and the corresponding redundant frame and enhances transmission robustness. In addition, a decoder no more has a requirement for an order of decoding the primary frame and the redundant frame, which improves transmission flexibility.

Embodiment 8

Figure 8:
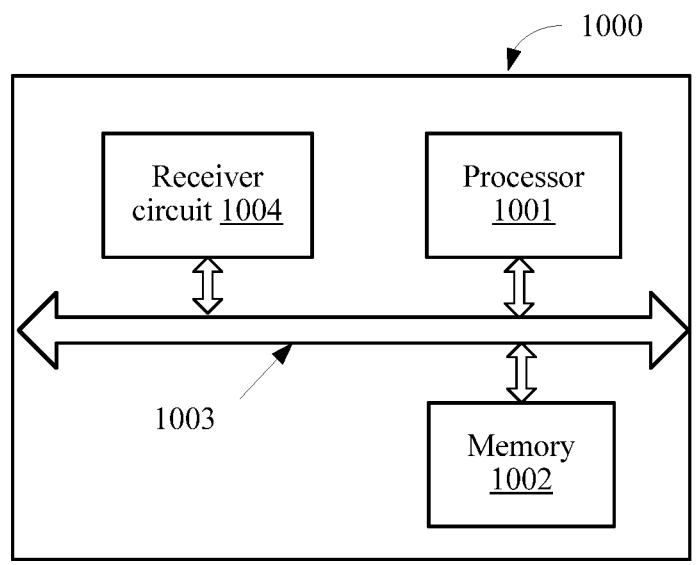
FIG. 8 is a schematic structural diagram of a video data decoding apparatus according to Embodiment 8 of the present application.

As shown in FIG. 8, this embodiment of the present application provides a video data decoding apparatus 1000. Furthermore, the apparatus may include a general-purpose processor (for example, a CPU) or a dedicated processor (for example, a GPU) that is configured to perform the video data decoding method shown in FIG. 2. The apparatus 1000 includes a processor 1001, a receiver circuit 1004, a memory 1002, and a bus 1003. Furthermore, the receiver circuit 1004 may be configured to receive an encoded bitstream, the memory 1002 is configured to store data obtained in a processing process, and the bus 1003 is configured to connect various apparatuses to carry communication. The foregoing apparatus is configured to perform the video data decoding method shown in FIG. 2, and the processor 1001 may be configured as follows.

The processor 1001 is configured to determine a to-be-decoded frame from a to-be-decoded bitstream.

The processor 1001 is further configured to determine whether the frame belongs to a primary frame or a redundant frame. Exemplarily, nal_unit_type may be parsed, if nal_unit_type is PREFIX_SEI_NUT, payloadType is parsed, if payloadType is a value A, the frame belongs to a primary frame.

Optionally, the processor 1001 is further configured to determine, according to bitstream information, a location relationship between the frame and a redundant frame corresponding to the frame. In a special case, a GOP relationship between the primary frame and the corresponding redundant frame further needs to be determined to describe the location relationship when it is allowed that the primary frame and the corresponding redundant frame are located in different GOPs.

The processor 1001 is further configured to determine a POC of the frame.

The processor 1001 is further configured to parse the bitstream to derive encoding data information of the frame according to a video compression coding standard.

The processor 1001 is further configured to reconstruct the to-be-decoded frame according to information obtained by parsing the bitstream corresponding to the frame.

The processor 1001 is further configured to output a decoded frame in an order specified by the POC.

Embodiment 9

This embodiment of the present application provides a video data decoding apparatus, including a processor that is configured to perform the video data decoding method shown in FIG. 3. The processor is further configured as follows.

The processor is configured to determine a to-be-decoded frame from a to-be-decoded bitstream.

The processor is further configured to determine whether the frame belongs to a primary frame or a redundant frame. Exemplarily, nal_unit_type may be parsed, if nal_unit_type is PREFIX_SEI_NUT, payloadType is parsed, if payloadType is a value B, the frame belongs to a redundant frame.

The processor is further configured to determine a location relationship between the frame and a primary frame corresponding to the frame. In a special case, to describe the location relationship a GOP relationship between the redundant frame and the corresponding primary frame further needs to be determined when it is allowed that the redundant frame and the corresponding primary frame are located in different GOPs.

The processor is further configured to determine whether a primary frame has been generated at the foregoing obtained location.

The processor is further configured to discard all information about the to-be-decoded frame if the primary frame is generated.

Embodiment 10

This embodiment of the present application provides a video data decoding apparatus, including a processor that is configured to perform the video data decoding method shown in FIG. 4. The processor is further configured as follows.

The processor is configured to determine a to-be-decoded frame from a to-be-decoded bitstream.

The processor is further configured to determine whether the frame belongs to a primary frame or a redundant frame. Exemplarily, nal_unit_type may be parsed, if nal_unit_type is PREFIX_SEI_NUT, payloadType is parsed, if payloadType is a value B, the frame belongs to a redundant frame.

The processor is further configured to determine a location relationship between the frame and a primary frame corresponding to the frame. In a special case, when it is allowed that the redundant frame and the corresponding primary frame are located in different GOPs, to describe the location relationship, a GOP relationship between the redundant frame and the corresponding primary frame further needs to be determined.

The processor is further configured to determine whether a primary frame has been generated at the foregoing obtained location.

The processor is configured to determine attribute information of the primary frame corresponding to the frame if the primary frame has not been generated.

The processor is further configured to determine a POC of the frame.

The processor is further configured to parse the bitstream to derive encoding data information of the frame according to a video compression coding standard.

The processor is configured to reconstruct the to-be-decoded frame according to information obtained by parsing the bitstream corresponding to the frame.

The processor is further configured to output a decoded frame in an order specified by the POC.

Embodiment 11

This embodiment of the present application provides a video data decoding apparatus, including a processor that is configured to perform the video data decoding method shown in FIG. 5. The processor is further configured as follows.

The processor is configured to determine a to-be-decoded frame from a to-be-decoded bitstream.

The processor is further configured to determine whether the frame belongs to a primary frame or a redundant frame. Exemplarily, nal_unit_type may be parsed, if nal_unit_type is PREFIX_SEI_NUT, payloadType is parsed, if payloadType is a value B, the frame belongs to a redundant frame.

The processor is further configured to determine a location relationship between the frame and a primary frame corresponding to the frame. In a special case, to describe the location relationship a GOP relationship between the redundant frame and the corresponding primary frame further needs to be determined when it is allowed that the redundant frame and the corresponding primary frame are located in different GOPs.

The processor is further configured to determine whether a primary frame has been generated at the foregoing location.

The processor is configured to determine attribute information of the primary frame corresponding to the frame if the primary frame has not been generated.

The processor is further configured to determine a POC of the frame.

The processor is further configured to parse the bitstream to derive encoding data information of the frame according to a video compression coding standard.

The processor is further configured to reconstruct the to-be-decoded frame according to information obtained by parsing the bitstream corresponding to the frame.

The processor is further configured to store the to-be-decoded frame in an order specified by the POC.

The processor is further configured to output a decoded frame in an order specified by the POC if primary frame data corresponding to the to-be-decoded frame is not obtained by means of parsing after a specified delay.

Embodiment 12

This embodiment of the present application provides a video data decoding apparatus, including a processor that is configured to perform the video data decoding method shown in FIG. 6. The processor is further configured as follows.

The processor is configured to determine a to-be-decoded frame from a to-be-decoded bitstream.

The processor is further configured to determine whether the frame belongs to a primary frame or a redundant frame. Exemplarily, nal_unit_type may be parsed, if nal_unit_type is PREFIX_SEI_NUT, payloadType is parsed, if payloadType is a value A, the frame belongs to a primary frame.

Optionally, the processor is configured to determine, according to bitstream information, a location relationship between the frame and a redundant frame corresponding to the frame. In a special case, to describe the location relationship a GOP relationship between the primary frame and the corresponding redundant frame further needs to be determined when it is allowed that the primary frame and the corresponding redundant frame are located in different GOPs.

The processor is further configured to determine a POC of the frame.

The processor is further configured to parse the bitstream to derive encoding data information of the frame according to a video compression coding standard.

The processor is further configured to reconstruct the to-be-decoded frame according to information obtained by parsing the bitstream corresponding to the frame.

The processor is further configured to output a decoded frame in an order specified by the POC.

According to the decoding apparatus provided in Embodiment 7 to Embodiment 12 of the present application, location relationship information of a primary frame and a corresponding redundant frame may be decoded, and it is allowed that a gap is kept between locations of the primary frame and the corresponding redundant frame in a bitstream, which reduces a possibility of losing both the primary frame and the corresponding redundant frame and enhances transmission robustness. In addition, a decoder no more has a requirement for an order of decoding the primary frame and the redundant frame, which improves transmission flexibility.

It should be additionally noted that in the embodiments of the present application, in an encoding process, there is no sequential order between a step of generating a primary information group corresponding to a to-be-encoded information group and a step of generating a redundant information group corresponding to the to-be-encoded information group. The embodiments of the present application do not further require that the step of generating the primary information group corresponding to the to-be-encoded information group is necessarily preformed before the step of generating the redundant information group corresponding to the to-be-encoded information group. Correspondingly, in a decoding process, the embodiments of the present application also do not limit a sequential order of obtaining, by means of parsing, a primary information group corresponding to a to-be-decoded information group and obtaining, by means of parsing, a redundant information group corresponding to the to-be-decoded information group.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present application but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:
1. A video data encoding method, comprising:
   determining a to-be-encoded information group in a to-be-encoded video sequence;
   generating a primary information group corresponding to the to-be-encoded information group, the primary information group comprising a first data information, a first indication information that indicates whether the to-be-encoded information group is the primary information group or a redundant information group, and location information of the primary information group, and the redundant information group comprising a second data information, location information of the redundant information group, a second indication information that indicates whether the to-be-encoded information group is the primary information group or the redundant information group, and location relationship information of the redundant information group and the primary information group;

generating the redundant information group corresponding to the to-be-encoded information group by:
   determining whether the primary information group has been generated;
   setting a preset location relationship information as the location relationship information of the redundant information group and the primary information group when the primary information group has not been generated:
   generating the second data information and the location information of the redundant information group when the primary information group has not been generated;
   calculating the location relationship information of the redundant information group and the primary information group when the primary information group has been generated;
   setting the location relationship information as the location relationship information of the redundant information group and the primary information group when the primary information group has been generated; and
   generating the second data information and the location information of the redundant information group when the primary information group has been generated; and
encoding the primary information group and the redundant information group into a bitstream.

2. The video data encoding method of claim 1, wherein the location information of the primary information group comprises a location of the primary information group in the bitstream, an order of the primary information group in an encoding process, or a picture display order of the primary information group, and wherein the location information of the redundant information group comprises a location of the redundant information group in the bitstream, an order of the redundant information group in the encoding process, or a picture display order of the redundant information group.

3. The video data encoding method of claim 1, wherein generating the primary information group corresponding to the to-be-encoded information group further comprises:
   generating the first data information and the location information of the primary information group when the redundant information group has not been generated; and
   generating the first data information and the location information of the primary information group when the redundant information group has been generated.

4. The video data encoding method of claim 2, wherein the location information is the picture display order, the primary information group corresponding to the to-be-encoded information group is generated and the redundant information group corresponding to the to-be-encoded information group is generated, and the method further comprises setting the picture display order of the primary information group and the redundant information group according to a preset rule such that the picture display order of the primary information group is different from that of the redundant information group.

5. A video data decoding method, comprising:
   acquiring a to-be-decoded bitstream;
   determining a to-be-decoded information group;
   obtaining, by parsing, a primary information group corresponding to the to-be-decoded information group, the primary information group comprising a first data information, a first indication information that indicates whether the to-be-decoded information group is the primary information group or a redundant information group, and location information of the primary information group, the redundant information group comprising a second data information, location information of the redundant information group, a second indication information that indicates whether the to-be-decoded information group is the primary information group or the redundant information group, and location relationship information of the redundant information group and the primary information group, and the location relationship information of the redundant information group and the primary information group being used to deduce the location information of the primary information group;
   obtaining, by parsing, the redundant information group corresponding to the to-be-decoded information group by:
      determining whether the primary information group is correctly obtained by parsing;
      stopping parsing the to-be-decoded information group without further needing to obtain, by parsing, the redundant information group corresponding to the to-be-decoded information group when the primary information group is correctly obtained by parsing; and
      continuing to obtain, by parsing, the redundant information group corresponding to the to-be-decoded information group when the primary information group is not correctly obtained by parsing, the redundant information group comprising the second data information, the location information of the redundant information group, the second indication information that indicates whether the to-be-decoded information group is the primary information group or the redundant information group, and the location relationship information of the redundant information group and the primary information group, and the location relationship information of the redundant information group and the primary information group being used to deduce the location information of the primary information group; and
   acquiring a decoded information group based on the primary information group obtained by parsing or the redundant information group obtained by parsing, the decoded information group being acquired based on the primary information group obtained by parsing when the primary information group is correctly obtained by parsing, the decoded information group being acquired based on the redundant information group obtained by parsing when the primary information group is not correctly obtained by parsing, and the decoded information group being used for reconstruction of an encoded video sequence.

6. The video data decoding method of claim 5, wherein the location information of the primary information group comprises a location of the primary information group in the to-be-decoded bitstream, an order of the primary information group in an encoding process, or a picture display order of the primary information group, and wherein the location information of the redundant information group comprises a location of the redundant information group in the to-be-decoded bitstream, an order of the redundant information group in the encoding process, or a picture display order of the redundant information group.

7. The video data decoding method of claim 6, wherein the location relationship information comprises an absolute value of a location difference between a sequential order of the redundant information group and the primary information group, and wherein the absolute value of the location difference and the sequential order comprise an absolute value of a location difference between the sequential order of the primary information group and the redundant information group in the to-be-decoded bitstream, an absolute value of an order difference between the sequential order of the primary information group and the redundant information group in the encoding process, or an absolute value of a picture display order difference between the sequential order of the primary information group and the redundant information group.

8. The video data decoding method of claim 7, wherein the location relationship information further comprises a flag information that indicates whether the location information of the redundant information group and the location information of the primary information group belong to a same picture group.

9. The video data decoding method of claim 8, wherein the location relationship information further comprises a quantity of picture groups that the redundant information group and the primary information group are spaced apart when the location information of the redundant information group and the location information of the primary information group do not belong to the same picture group.

10. The video data decoding method of claim 7, wherein the location relationship information further comprises a quantity of picture groups that the redundant information group and the primary information group are spaced apart.

11. The video data decoding method of claim 6, wherein when the location information is the picture display order, and when the primary information group corresponding to the to-be-decoded information group is generated and the redundant information group corresponding to the to-be-decoded information group is generated, the method further comprises confirming the picture display order of the primary information group and the redundant information group according to picture display order that are of the primary information group and the redundant information group and that are set according to a preset rule, the picture display order of the primary information group is different from that of the redundant information group.

12. The video data decoding method of claim 11, wherein the picture display order of the primary information group is set to consecutive even numbers, and the picture display order of the redundant information group is set to 1 plus the picture display order of a corresponding primary information group.

13. The video data decoding method of claim 5, wherein the redundant information group further comprises attribute information of the primary information group corresponding to the redundant information group.

14. The video data decoding method of claim 13, wherein the attribute information of the primary information group comprises at least one of the following information:
   a first information that indicates whether the primary information group belongs to an instantaneous refresh frame;
   a second information that indicates whether the primary information group can be referenced;
   a third information that indicates whether the primary information group is displayed at a decoder; and
   a fourth information that indicates whether the primary information group can be discarded.

15. The video data decoding method of claim 5, wherein the to-be-decoded information group comprises any one or more of a picture, a frame, a slice, a tile, and a set of basic coding units (CUs).

16. The video data decoding method of claim 5, wherein the location relationship information is located in at least one of supplemental enhancement information, a network abstraction layer unit header, a slice header, a frame header, a tile header, or a picture parameter set.

17. The video data decoding method of claim 13, wherein the second indication information that indicates whether the to-be-decoded information group is the primary information group or the redundant information group and the attribute information of the primary information group corresponding to the redundant information group are located in at least one of supplemental enhancement information, a network abstraction layer unit header, a slice header, a frame header, a tile header, or a picture parameter set.

18. A video data decoding apparatus, comprising:
   a memory; and
   a processor coupled to the memory and configured to:
      acquire a to-be-decoded bitstream;
      determine a to-be-decoded information group;
      obtain, by parsing, a primary information group corresponding to the to-be-decoded information group, the primary information group comprising a first data information, a first indication information that indicates whether the to-be-decoded information group is the primary information group or a redundant information group, and location information of the primary information group the redundant information group comprising a second data information, location information of the redundant information group, a second indication information that indicates whether the to-be-decoded information group is the primary information group or the redundant information group, and location relationship information of the redundant information group and the primary information group, and the location relationship information of the redundant information group and the primary information group being used to deduce the location information of the primary information group;
      obtain, by parsing, the redundant information group corresponding to the to-be-decoded information group by:
         determining whether the primary information group is correctly obtained by parsing;
         stopping parsing of the to-be-decoded information group without further needing to obtain, by parsing, the redundant information group corresponding to the to-be-decoded information group when the primary information group is correctly obtained by parsing; and
         continuing to obtain, by parsing, the redundant information group corresponding to the to-be-decoded information group when the primary information group is not correctly obtained by parsing, the redundant information group comprising the second data information, the location information of the redundant information group, the second indication information that indicates whether the to-be-decoded information group is the primary information group or the redundant information group, and the location relationship information of the redundant information group and the primary information group, and the location relationship information of the redundant information group and the primary information group being used to deduce the location information of the primary information group; and acquire a decoded information group based on the primary information group obtained by parsing or the redundant information group obtained by parsing, the decoded information group being acquired based on the primary information group obtained by parsing when the primary information group is correctly obtained by parsing, the decoded information group being acquired based on the redundant information group obtained by parsing when the primary information group is not correctly obtained by parsing, and the decoded information group being used for reconstruction of an encoded video sequence.

19. The video data decoding apparatus of claim 18, wherein the to-be-decoded information group comprises any one or more of a picture, a frame, a slice, a tile, and a set of basic coding units (CUs).

20. The video data decoding apparatus of claim 18, wherein the location relationship information is located in at least one of supplemental enhancement information, a network abstraction layer unit header, a slice header, a frame header, a tile header, or a picture parameter set.

* * * * *